April 27, 1948.  A. G. LARSON  2,440,340
CONTROL APPARATUS FOR REVERSIBLE LOCOMOTIVES
Filed June 21, 1946  2 Sheets-Sheet 1
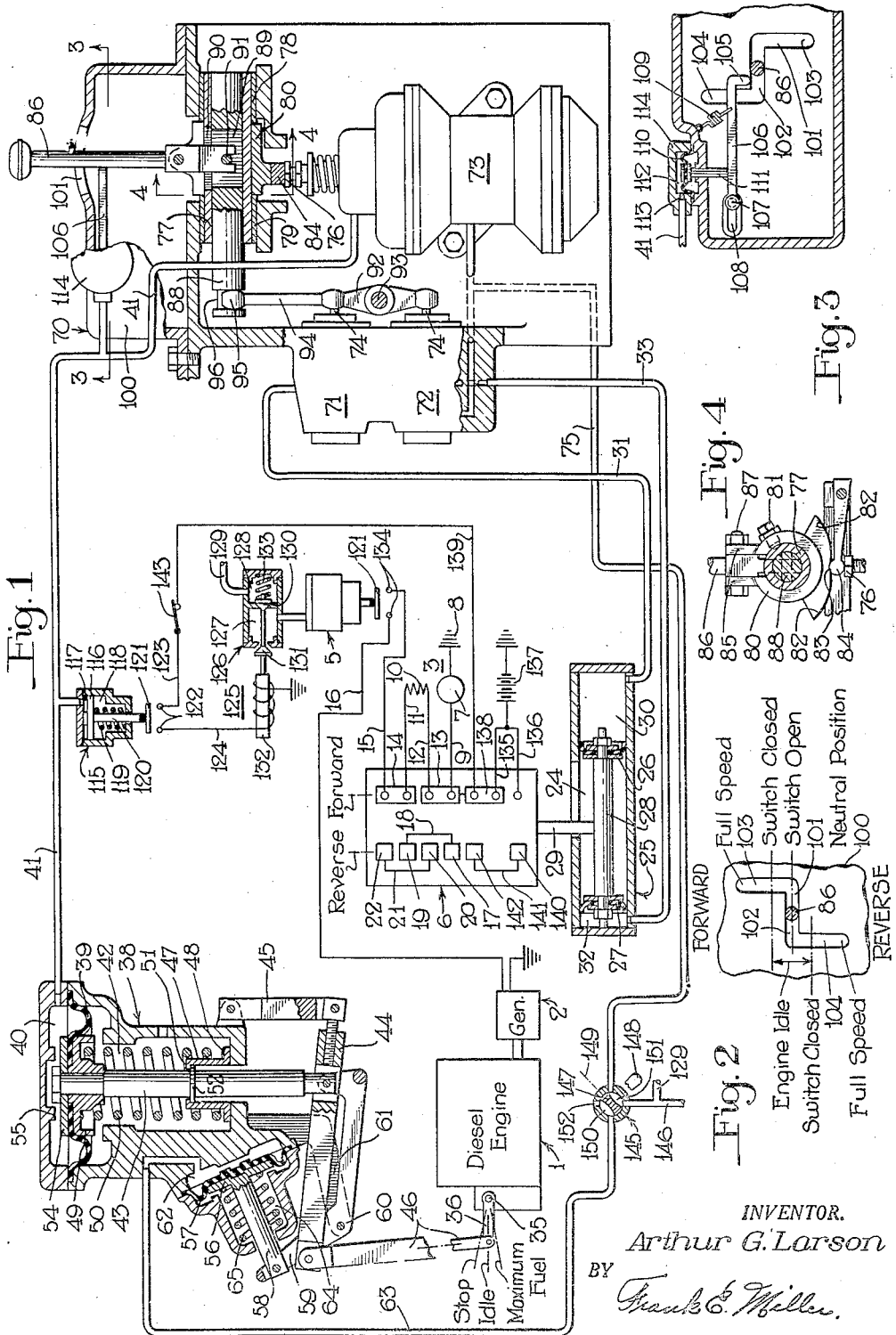
INVENTOR.
Arthur G. Larson
BY
Frank E. Miller
ATTORNEY April 27, 1948.    A. G. LARSON    2,440,340
CONTROL APPARATUS FOR REVERSIBLE LOCOMOTIVES
Filed June 21, 1946    2 Sheets-Sheet 2
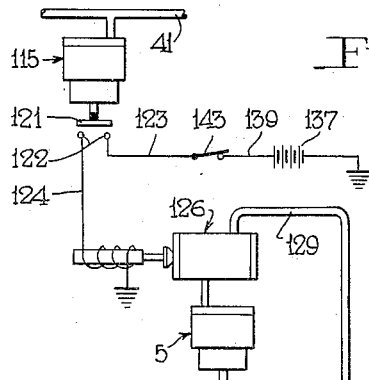
Fig. 5
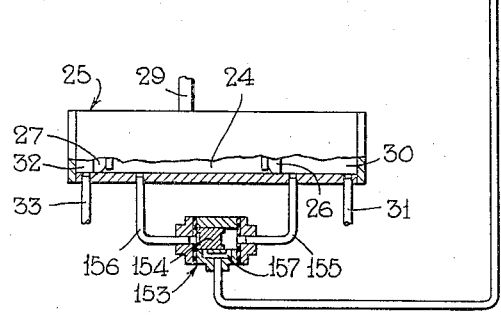
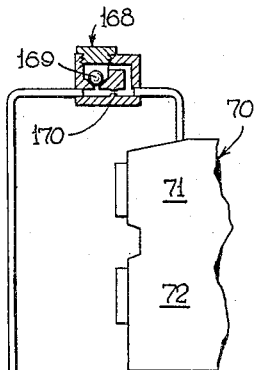
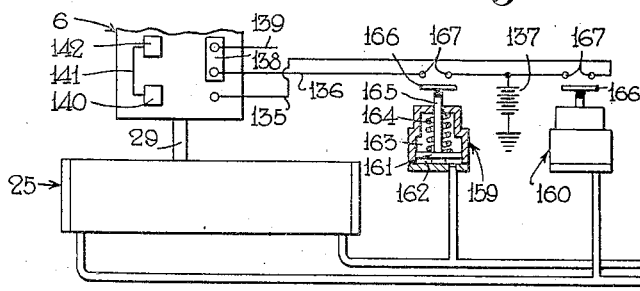
Fig. 6
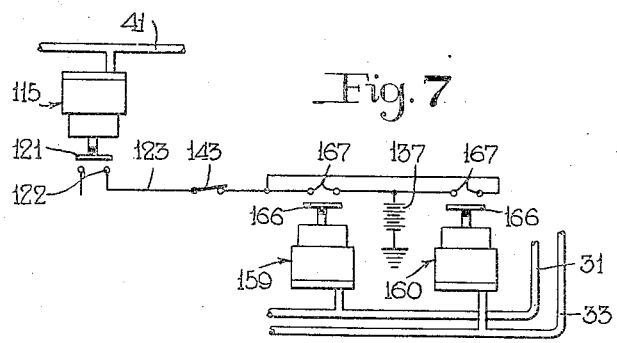
Fig. 7
*INVENTOR.*
*Arthur G. Larson*
BY
*Frank E. Miller*
ATTORNEY Patented Apr. 27, 1948

2,440,340

UNITED STATES PATENT OFFICE 2,440,340

CONTROL APPARATUS FOR REVERSIBLE LOCOMOTIVES

Arthur G. Larson, Forest Hills, Pa., assignor to The Westinghouse Air Brake Company, Wilmerding, Pa., a corporation of Pennsylvania Application June 21, 1946, Serial No. 678,265

22 Claims. (Cl. 290—17)

This invention relates to control apparatus for reversible locomotives of the type employing generators operable by internal combustion engines for providing electric current to operate propulsion or traction motors for driving the locomotive.

One object of the invention is the provision of an improved control apparatus of the above type for controlling the speed of the internal combustion engine and the current supply to the traction motor or motors by operation of a single operator's control lever.

Another object of the invention is the provision of an improved control apparatus of the above type so constructed as to prevent making or breaking the traction motor circuit during heavy current flow, as when the engine is operating above a chosen reduced speed.

Another object of the invention is the provision of an improved control apparatus of the above type embodying reversing means for carrying current from the generator to the traction motor but so constructed as to prevent said reversing means from either making or breaking the traction motor circuit during flow of current therein.

Other objects and advantages will become apparent from the following more detailed description of the invention.

In the accompanying drawings; Fig. 1 is a diagrammatic view partly in section and partly in outline of a control apparatus constructed in accordance with one form of the invention; Fig. 2 is a partial plan view of an operator's control device shown in Fig. 1; Figs. 3 and 4 are sectional views taken on lines 3—3 and 4—4, respectively, in Fig. 1; and Figs. 5, 6 and 7 diagrammatic views of modifications of the invention.

Description—Figs. 1 to 4

As shown in the drawing, the reference numeral 1 designates an internal combustion engine, which may be of the Diesel type, and which is arranged to operate an electric generator 2 for supplying electric current to operate a locomotive propulsion or traction motor 3, the supply of current to said motor being by way of a switch device 5, and a motor reverser 6.

The propulsion motor 3 may comprise a motor armature 7 connected between a ground 8 and a lead 9 leading to the reverser 6, and a field coil 10 connected by leads 11 and 12 to said reverser. The reverser 6 may have forward and reverse positions as indicated by lines and legends in the drawing. In the forward position of the reverser 6 contact 13 thereon connects the motor lead 9 to the field lead 12, while a contact 14 connects the field lead 11 to a conductor 15. The switch device 5 is adapted to connect the conductor 15 to a conductor 16, as will be later described, the conductor 16 leading to the generator 2. With the circuit just described closed and with the engine 1 operating the generator 2 current will be supplied from said generator to the traction motor 3 to cause operation thereof to propel the locomotive in a forward direction.

In the reverse position of the reverser 6 the motor armature lead 9 will be connected by a contact 17 on the reverser, a wire 18 and another contact 19 to the field lead 11, while the other field lead 12 will be connected by a contact 20 on the reverser, a wire 21 and another contact 22 to the conductor 15, so that with the switch device 5 connecting conductors 15 and 16 and with the engine 1 operating current will be supplied by generator 2 to the motor 3 to cause operation thereof to propel the locomotive in a reverse direction.

A fluid operated reversing motor 25 is provided for moving the reverser 6 to its forward and reverse positions. This motor comprises a casing containing two oppositely arranged pistons 26 and 27 connected for movement in unison by a rod 28. A member 29 connects the rod 28 to the reverser 6 whereby upon movement of the pistons 26 and 27 in the direction of the left hand to the position in which they are shown in the drawing the reverser 6 will assume forward position, while upon movement in the opposite direction to a position defined by contact between piston 26 and the right hand end of the casing the reverser will assume its reverse position. At the outer face of the reverser piston 26 is a pressure chamber 30 connected to a forward pipe 31, while at the opposite face of piston 27 is a pressure chamber 32 connected to a reverse pipe 33. Between the pistons 26 and 27 is a non-pressure chamber 34.

In operation, when fluid under pressure is supplied to the forward pipe 31 at a time when the reverse pipe 33 is open to atmosphere, in a manner which will be later described, the reversing motor 25 will move the reverser 6 to its forward position, while upon supply of fluid under pressure through pipe 33 to piston chamber 32, when piston chamber 30 is open to atmosphere through the forward pipe 31, the reversing motor 25 will move the reverser 6 to its reverse position.

The engine 1 has a rockable shaft 35 for varying the amount of fuel supplied to said engine to thereby vary the speed or power output of the engine, in any conventional manner. A lever 36 is connected to shaft 35 for turning it to different positions, said lever and shaft having an idle position, in which they are shown in the drawing, a stop position at one side of said idle position for cutting off the supply of fuel to said engine, and a maximum fuel position at the opposite side of said idle position, adjustment of said lever between the idle and maximum fuel position being adapted to provide for operation of the engine at any desired degree of speed or power output for in turn causing a corresponding electric output from the generator 2. The stop, idle, and maximum fuel positions are indicated in the drawing by dot-dash lines and suitable legends.

For adjusting the fuel control lever 36 a fluid motor 38 is provided which comprises a casing containing a movable abutment preferably in the form of a flexible diaphragm 39 which is clamped around its edge in the casing. At one side of diaphragm 39 is a pressure chamber 40 connected to a speed control pipe 41, while at the opposite side of said diaphragm is a non-pressure chamber 42. A rod 43 extending through the non-pressure chamber 42 has one end connected to diaphragm 39 centrally thereof. The opposite end of rod 43 is disposed outside of the casing and is connected to a lever 44 one end of which is pivotally connected to one end of a link 45 the opposite end of which is pivotally connected to the casing of the device. The opposite end of lever 44 is adapted to be connected by a link 46 to the free end of the fuel control lever 36 on the engine 1. Slidably mounted on rod 43 within the non-pressure chamber 42 is a spring seat 47 having at one end an outturned annular flange 48 adapted to contact the casing around the opening through which said rod extends for connection with the lever 44. Interposed between the flange 48 and a head 49 on rod 43, which head engages one side of the flexible diaphragm 34, is a control spring 50 which is of the coil type encircling said rod. At the opposite end of spring seat 47 is an inturned flange 51 arranged to be engaged by a ring or collar 52 secured to the rod 43 for limiting movement of said seat in a direction away from the diaphragm 39. The spring 50 is interposed between the rod head 49 and flange 48 in the spring seat 47 under such compression as to require a chosen pressure of fluid, such as 15 pounds, in diaphragm chamber 40 for initiating movement of said diaphragm against the force of said spring when flange 48 on the spring seat 47 is in contact with the casing, in which position it is shown in the drawing.

With the parts of motor 38 in the position in which they are shown in the drawings the fuel control lever 36 on engine 1 will be in its idle position. Upon an increase in pressure of fluid in pressure chamber 40 above the chosen degree just mentioned, the diaphragm 39 will move against spring 50 to actuate lever 44 for moving the fuel control lever 36 out of idle position in the direction of its maximum fuel position, the degree of movement of the fuel control lever 36 out of idling position corresponding to the increase in pressure in pressure chamber 40 above the chosen degree above mentioned. When a chosen maximum pressure of fluid is provided in diaphragm chamber 40 the fuel control lever 36 will assume its maximum fuel position.

The diaphragm 39 and rod 43 are also movable from idle position, in which these parts are shown in the drawing, in an upwardly direction for pulling the fuel control lever 36 to its stop position, in which position a head 54 mounted on said diaphragm in chamber 40 will contact a stop 55 in the casing. When the diaphragm 39 and rod 53 are thus moved to stop position as defined by stop 55, the collar 52 on rod 43 engaging flange 51 on the spring seat 47 will move said seat and the control spring 50 with said diaphragm, as will be apparent.

For moving the flexible diaphragm 39, rod 43 and levers 44 and 36 to their stop position, a flexible diaphragm 57 is clamped in the casing around its edge and is operatively connected to rod 43 through the medium of a rod 58 having a follower 56 contacting said diaphragm, and a lever 59 connected at its opposite ends to rods 43 and 58 and fulcrumed intermediate its ends on a pin 60 carried by an arm 61 projecting from the casing. At one side of diaphragm 57 is a pressure chamber 62 which is open to a fuel cut-off pipe 63, while at the opposite side is a non-pressure chamber 64 containing a bias spring 65 acting on the diaphragm follower 56. When the fuel cut-off pipe 63 and diaphragm chamber 62 are open to atmosphere, in a manner which will be later described, the spring 53 will actuate the diaphragm follower 56, rod 58 and lever 59 to move rod 43 to the position in which flange 48 on the spring seat 47 contacts the casing. Upon operation of diaphragm 39 to move the fuel control lever 36 out of idle position in the direction of maximum fuel position the diaphragm 57 will move with said rod under the pressure of bias spring 65. However when diaphragm 39 is in its idle position and pressure chamber 40 is open to atmosphere and fluid under pressure is supplied through the fuel cut-off pipe 63 to the diaphragm chamber 62, the latter pressure acting on diaphragm 57 will actuate rod 58, lever 59, and rod 43 to move diaphragm 39 to the position defined by contact of the diaphragm head 54 with stop 55, for thereby pulling the fuel control lever 36 to stop position.

The forward and reverse pipes 31 and 33 and the speed control pipe 41 are connected to an operator's control valve device 70 which may be substantially like that disclosed in Patent 2,388,357 issued to Ellis E. Hewitt on November 6, 1945. Since reference may be had to this patent the disclosure of the operator's control device in the drawing has been limited and the description thereof will hereinafter be likewise limited to only that deemed necessary to a clear understanding of the invention.

Briefly, the operator's control valve device 70 comprises a casing containing two selector valve devices 71 and 72 for controlling the supply and release of fluid under pressure to and from the forward and reverse pipes 31 and 33, respectively, and a self-lapping valve device 73 for controlling the supply and release of fluid under pressure to and from the speed control pipe 41.

The selector valve devices 71 and 72 are both identical in construction each comprising a plunger 74 and valve means (not shown) which are operable when said plunger assumes a position in which it is shown in the drawing to open the respective pipe 31 or 33 to atmosphere. Upon movement of plunger 74 into the device the valve means is adapted to operate to supply fluid under pressure to the respective pipe 31 or 33 from any suitable source such as a fluid pressure supply pipe 75.

The self-lapping valve device 73 may be of any suitable structure embodying a control member or plunger 76 which is operative upon downward movement from a normal position in which it is shown in the drawing to effect operation of valve means (not shown) to supply fluid to the speed control pipe 41 at a pressure depending upon the extent of such movement, and to open said pipe to atmosphere in said normal position.

A rock shaft 77 disposed above plunger 76 is journaled in the casing in two spaced bearings 78 and 79. A cam element 80 is secured on shaft 77 between its two bearings by means of a set screw 81, said element substantially engaging the adjacent ends of the two bearings for holding said rock shaft against longitudinal movement. At the side adjacent plunger 76 the cam element 80 has two like and oppositely arranged cam surfaces 82 joined by a recess 83 provided to receive one side of a power transmitting member 84 the opposite side of which is in contact with plunger 76. When the cam element 80 is positioned for recess 83 to receive the member 84 the control member or plunger 76 in the self-lapping valve device 73 will occupy its normal position to provide for opening of the speed control pipe 41 to atmosphere. Rotation of rock shaft 77 and thereby of cam element 80 in either direction from this normal position will move plunger 76 in a downwardly direction for actuating the self-lapping valve device 73 for supplying fluid to the speed control pipe 41 at a pressure proportional to the extent of such movement.

Opposite the recess 83 the cam element 80 has two spaced parallel arms 85 between which extends one end of an operator's control lever 86. A bolt 87 extends through the two arms 85 and the lever 86 to provide for rocking movement of the lever in the cam element lengthwise of the rock shaft 77. Movement of lever 86 circumferentially of the rock shaft 77 will actuate the cam element 80 for controlling the self-lapping valve device 73.

The rock shaft 77 is provided with an axial bore in which is slidably mounted a plunger 88 having a slot 89 aligned with a slot 90 through one side of said shaft. The inner end of the operator's control lever 86 extends through the slot 90 and into slot 89 and within shaft 77 is connected to plunger 88 by means of a pin 91 secured to said plunger. Rocking of lever 86 in either direction from a neutral position shown, lengthwise of the rock shaft 77 will thus move plunger 88 in the direction of its length.

The plungers 74 of the two selector valves 71 and 72 are adapted to be engaged by opposite ends of a lever 92 which is fulcrumed at its center on a pin 93. The lever 92 has an extension 94 the end of which is in the form of a yoke 95. The two parts of this yoke are disposed at opposite sides of plunger 88 in an annular groove or recess 96 therein whereby the lever 92 will be rocked upon movement of plunger 88 in either direction from a normal or neutral position in which it is shown in the drawing. With plunger 88 in the normal position, and thereby with lever 92 in its normal position in which it is shown in the drawing, the two plungers 74 of the selector valve devices 71 and 72 will occupy the position shown for opening the forward and reverse pipes 31 and 33, respectively, to atmosphere.

A cover 100 secured to the casing of the manually operative control device is provided with a slot 101 in which the operator's control lever 86 is arranged to move for controlling the sequence of operation of the selector valve devices 71 and 72 and of the self-lapping valve device 73. The slot 101 comprises a central portion 102 providing for movement of the operator's control lever 86 lengthwise of the rock shaft 77 for controlling the two selector valve devices 71 and 72 while retaining the rock shaft 77 in a neutral position providing for operation of the self-lapping valve device 73 to maintain the speed control pipe 41 open to atmosphere. Movement of the operator's control lever 86 toward the right hand from neutral position will move plunger 88 in the direction of the left hand for thereby actuating lever 92 to move plunger 74 in the selector valve device 71 into said device while permitting plunger 74 in the selector valve device 72 to remain in its normal position in which it is shown in the drawing, whereupon fluid under pressure will be supplied to the forward pipe 31 while the reverse pipe 33 will be open to atmosphere. On the other hand, movement of the lever 86 from its neutral position in the direction of the left hand will move plunger 88 in the direction of the right hand for operating the selector valve device 72 to supply fluid under pressure to the reverse pipe 33 while permitting the selector valve device 71 to maintain the forward pipe 31 open to atmosphere. This operation of the two selector valve devices 71 and 72 to supply fluid under pressure to pipes 31 and 33 will be obtained, at respectively, opposite ends of the portion 102 of the slot 101.

At the right hand end of the portion 102 of slot 101 the operator's control lever 86 may be moved at right angles into a portion 103 of said slot for thereby rocking the rock shaft 77 for actuating the self-lapping valve device 73 to supply fluid to the speed control pipe 41 at a pressure proportional to the extent of movement away from the portion 102. At the opposite end of the portion 102 of slot 101 the lever 86 is movable into a right angular portion 104 for actuating the rock shaft 77 in the opposite direction to effect, however, the same operation of the self-lapping valve device 73 to provide fluid to the speed control pipe 41 at a pressure proportional to the extent of movement away from the portion 102 of the slot. In the portion 102 of slot 101 the self-lapping valve device 73 is adapted to open the speed control pipe 41 to atmosphere. At each of the opposite sides of the central portion 102 of the slot there is a position designated in the drawing by the legend "switch closed" in which the self-lapping valve device 73 will provide fluid in pipe 41 at a certain chosen pressure, such as 15 pounds.

The operator's control device further comprises interlock means consisting of a finger 105 which is arranged to move into the path of movement of lever 86 through the central portion 102 of slot 101 for preventing said lever from being moved from one end of said portion of said slot to the opposite end for a certain period of time. The finger 105 is provided on one end of a member 106 which is rockable about a pin 107 secured in the cover 100, said member being provided with a slot 108 to allow a certain movement of said member relative to said pin in order to permit movement of the operator's control lever 86 substantially to its neutral position upon engagement of finger 105 with either side of said lever. A spring 109 having one end anchored to cover 100 is connected under tension to member 106 for pulling said member out of the path of movement of the operator's lever 86. For moving the finger 105 into the path of movement of the operator's control lever there is provided a movable abutment, preferably in the form of a flexible diaphragm 110, which is clamped around its edge between the casing of the control device and a cover 114. This diaphragm has one side connected with member 106 through the medium of a pin 111, and at its opposite side within cover 114 there is a pressure chamber 112 which is open thru a restricted opening or port 113 in cover 114 to the speed control pipe 41 and its connection with the self-lapping valve device 73.

Connected to the speed control pipe 41 is a pneumatically controlled switch device 115 which comprises a casing containing a piston 116. At one side of piston 116 is a pressure chamber 117 which is open to the speed control pipe 41 while at the opposite side is a non-pressure chamber 118 containing a spring 119 acting on the piston 116 with a force which requires a chosen pressure of fluid, such as 10 pounds, in the speed control pipe 41 and in the pressure chamber 117 to move said piston against said spring out of a normal position in which said piston is shown in the drawing. A rod 120 has one end connected to the piston 116. The rod 120 extends to the exterior of the casing, and connected to its outer end is a movable switch contact 121 adapted to bridge two stationary contacts 122 for connecting an electrical conductor 123 to an electrical conductor 124 leading to a magnet 125 of an electro-magnet valve device 126.

The electro-magnet valve device 126 comprises a casing having a chamber 127 connected to the switch device 5 and a chamber 128 connected to a fluid pressure supply pipe 129. A valve 130 contained in chamber 128 is provided for controlling flow of fluid under pressure from chamber 128 to chamber 127 and thence to the switch device 5. The valve 130 is connected by a stem to an oppositely seating valve 131 arranged to control communication between chamber 127 and atmosphere. The magnet 125 comprises a solenoid 132 connected to the valves 131 and 130 and encircled by a magnet coil connected to conductor 124. Upon energization of magnet 125 the valve 131 will be closed and the valve 130 will be open, while upon deenergization of said magnet a spring 133 acting on valve 130 is adapted to seat said valve and to unseat the valve 131.

The switch device 5, may for the purpose of illustration, be identical to the switch device 115 except for the control spring 119 therein which may allow operation of the switch device 5 by a lower pressure of fluid in pressure chamber 117 than is required to operate the switch device 115. The movable contact 121 of the switch device 5 is adapted to bridge two fixed contacts 134 for electrically connecting the conductors 15 and 16 from the motor reverser 6 and the generator 2.

Two conductors 135 and 136 supplied with electric current from any suitable source, such as a battery 137 lead to the motor reverser 6 which is provided with a contact 138 for, in the forward position of said reverser, connecting the conductor 135 to a conductor 139. In the reverse position of the motor reverser 6 the conductors 136 and 139 are connected together by a contact 140 on the reverser, a wire 141 and a contact 142. The conductor 139 is adapted to be connected to conductor 123 by a manually operable switch 143.

The fluid pressure supply pipe 75 and fuel cut-off pipe 63 are connected to a manually operable valve 145, and also connected to said valve is a fluid pressure supply pipe 146 which may be constantly supplied with fluid under pressure from any suitable source. The manually operable valve device 145 comprises a casing in which is mounted a rotatable valve 147 adapted to be turned by a handle 148 from a normal position in which it is shown in the drawing to an engine stopping position indicated by the dot-dash line 149. The valve 147 has two oppositely arranged cavities 150 and 151, the cavity 151 establishing communication between the fluid pressure supply pipe 146 and pipe 75 while the cavity 150 connects pipe 63 to an atmospheric vent 152, when said valve and handle 148 are in the normal position. In the other position of valve 147 in which the handle 148 will be disposed in the position indicated by the dot-dash line 149 the cavity 151 will connect pipe 75 to the atmospheric vent 152, while cavity 150 will connect pipe 63 to the fluid pressure supply pipe 146. The fluid pressure supply pipe 129 connected to the electro-magnet valve device 126 may be connected to the fluid pressure supply pipe 151.

*Operation—Figs. 1 to 4*

In operation, let it be assumed that initially the manually operable valve 145 is in the position in which it is shown in the drawing for establishing a fluid pressure supply communication between pipes 146 and 75 and for opening the engine stop pipe 63 to atmosphere. Let it further be assumed that the operator's control lever 86 is in neutral position opening the forward and reverse pipes 31 and 33 and the speed control pipe 41, and thereby the diaphragm chamber 112 in the operator's control valve device, to atmosphere.

With diaphragm chamber 112 open to atmosphere spring 109 will operate member 106 to draw finger 105 out of the path of movement of the operator's control lever 86. With the forward and reverse pipes 31 and 33 open to atmosphere fluid under pressure will be vented from chambers 30 and 32 in the reversing motor 25, and let it be assumed that pistons 26 and 27 therein and the motor reverser 6 are in their forward positions as shown in the drawings. With the speed control pipe 41 open to atmosphere diaphragm chamber 40 in the fluid motor 38 will be open to atmosphere and with diaphragm chamber 62 in said motor also open to atmosphere through the manually operable valve 145 the parts of said motor will assume the position in which they are shown in the drawing for positioning the fuel control lever 36 on the engine in its idle position, and let it be assumed that said engine is operating at idling speed driving the generator 2 at a corresponding speed. With the speed control pipe 41 open to atmosphere the switch device 115 will be opening the circuit between conductors 123 and 124, and the magnet 125 of the electro-magnet device 126 will be deenergized permitting spring 133 to seat valve 130 and to open valve 131 for thereby opening diaphragm chamber 117 in the switch device 5 to atmosphere, so that the switch 121 of said device will be in its circuit opening position disconnecting the conductors 15 and 16.

Le it now be assumed that the operator desires to move the locomotive in a forward direction. To accomplish this he will move control lever 86 to the right hand end of the central portion 102 of slot 101 for effecting operation of the forward selector valve device 71 to supply fluid under pressure to pipe 31 and thence to piston chamber 30 of the reversing motor 25. With the pistons 26 and 27 of the reversing motor already in their forward position the supply of fluid under pressure to chamber 30 will be without effect, but it is desired to point out that with the motor reverser 6 also in its forward position electric current will be supplied from battery 137 through wire 135, contact 138 on said reverser and conductor 139 to the manually operable switch 143, and assuming that said switch is closed said conductor will be connected to the conductor 123.

The operator may now move lever 86 from the right hand end of the central portion 102 of the slot 101 into the portion 103 of said slot and prior to obtaining the switch closed position therein, the self-lapping valve device 73 will be operated by said lever to supply fluid to the speed control pipe 41 at a pressure sufficient to actuate the switch device 115 to close the circuit between conductors 123 and 124. Electric current from battery 137 will then be supplied to the magnet 125 for effecting energization thereof.

Energization of magnet 125 will seat valve 131 and open valve 130 whereupon fluid under pressure from the supply pipe 129 will flow past valve 130 to chamber 127 and thence to switch device 5 for operating said switch device to electrically connect the conductors 15 and 16 which connects the traction motor 3 thru the reverser 6 to the generator 2.

The speed control fluid motor 38 will remain in its idle position until after the operator's lever 31 is moved past the switch closed position in the portion 103 of slot 101, whereupon a sufficient pressure will be obtained in diaphragm chamber 40 of said motor to deflect the diaphragm 39 against the opposing force of control spring 50 for thereby actuating lever 44 to move the fuel control lever 36 out of its idling position in the direction of its maximum fuel position for accelerating the engine 1 and generator 2 for increasing the electrical output of said generator and thereby the supply of electric current for driving the traction motor 3. By suitable adjustment of the operator's control lever between the switch closed position and the full speed position in the portion 103 of slot 101 any desired degree of speed or power output of engine 1 between idling and maximum may be obtained and a corresponding output of the generator 2 will result for operating the traction motor 3.

When fluid under pressure is supplied to the speed control pipe 41 as above described it will also flow through choke 113 into diaphragm chamber 112 in the operator's control valve device 70 and therein act on diaphragm 110 to actuate member 106 to move finger 105 into the path of movement of the operator's control lever 86 through the central portion 102 of slot 101. Let it now be assumed that the operator desires to change the direction of movement of the locomotive from forward to reverse. To accomplish this he will move lever 86 from whatever position it may be in in the portion 103 of slot 101 back to the portion 102 of said slot and into engagement with the finger 105. When the lever 86 thus engages the finger 105 said finger will move in the direction of the left hand due to the slot 108 in member 106, to permit said lever to be moved to its neutral position and fluid under pressure will be released from the speed control pipe 41 and from the forward pipe 31, the reverse pipe 33 being open to atmosphere at this time the same as when the locomotive was operating in a forward direction.

When the pressure of fluid in the speed control pipe 41 becomes reduced to the chosen pressure (15 pounds) above mentioned the parts of the fluid motor 38 will return to their idle position to permit the fuel control lever 36 on engine 1 to move to idle position to permit reduction in the speed of said engine to idling speed and to permit a corresponding reduction in the output of generator 2. When the pressure of fluid in speed control pipe 41 then becomes further reduced to the chosen lower degree, such as the 10 pounds above mentioned, the switch device 115 will operate to open the circuit through conductors 123 and 124 for cutting off the supply of electric current to magnet 125, whereupon spring 133 in the magnet valve device 126 will close valve 130 and open valve 131 for releasing fluid under pressure from the switch device 5 to permit operation thereof to break the circuit between conductors 16 and 15 for cutting off the supply of electric current to the traction motor 3.

When the speed control pipe 41 is opened to atmosphere upon return of the operator's control lever 86 to neutral position as above described, the fluid pressure in diaphragm chamber 112 in the operator's control valve device will be gradually vented through the choke 113 to said pipe and thence to atmosphere, and after a certain time interval, sufficient to insure opening of switch device 115 and in turn operation of electro-magnet device 126 and thereby of the switch device 5 to break the traction motor circuit through conductors 16 and 15, the pressure of fluid in diaphragm chamber 112 will become reduced to a degree sufficient for spring 109 to move finger 105 out of the path of movement of the operator's control lever 86. The operator will then move lever 86 to the left hand end of the portion 102 of slot 101.

When the operator's control lever 86 is moved to a left hand end of the portion 102 of slot 101 it will operate the reverse selector valve device 72 to supply fluid under pressure to pipe 33 and thence to piston chamber 32 in the reversing motor 25. The fluid pressure thus provided in the reversing piston chamber 32 will then actuate piston 27 to move said piston and the piston 26 and thereby the motor reverser 6 to reverse position for reversing the field connections of the traction motor 3 and for also breaking the connection between the battery conductor 135 and conductor 139. The battery 137 will be then maintained disconnected from conductor 139 until the reverse position of the motor reverser 6 is obtained whereupon the battery will be reconnected to said conductor and to conductor 123 as before described. If the operator's control lever has been moved into the portion 104 of the slot 101, then as soon as the pressure of fluid in speed control pipe 41 is increased to the chosen degree (10 pounds) above mentioned the switch device 115 will move to its circuit closing position for supplying current from battery 137 to magnet 125 to effect energization of said magnet for closing valve 131 and for opening valve 130. Fluid under pressure will then be supplied past valve 130 to the switch device 5 for effecting operation thereof to close the traction motor circuit between conductors 16 and 15. Movement of lever 86 past the switch closed position into the portion 104 of the slot 101 will then cause operation of the speed control fluid motor 38 to cause acceleration of engine 1 to increase the power output of the generator 2 for causing operation of the traction motor 3 to propel the locomotive in the reverse direction at a desired speed.

With the locomotive operating in reverse, pressure of fluid in the speed control pipe will become effective in diaphragm chamber 112 of the operator's control device to move finger 105 into the path of movement of lever 86 thru the central portion 102 of slot 101 past its neutral position.

To change the direction of movement of the locomotive from reverse to forward, the lever 86 may now be moved out of the portion 104 of slot 101 into the portion 102 and into engagement with finger 86 which, due to slot 108 in the member 106, will give to allow movement of said lever to its neutral position for thereby opening the speed control pipe 41 and the reverse pipe 33 to atmosphere for releasing fluid under pressure therefrom. As the pressure of fluid in the speed control pipe 41 is reduced the speed control fluid motor 38 will first operate to move the fuel control lever 36 on the engine to idle position to permit reduction in speed of said engine to idling and a corresponding reduction in output of the generator 2, followed by operation of the switch device 115 to open the circuit controlled thereby. The magnet 125 will thereby be deenergized to permit closing of valve 130 and opening of valve 131 for venting fluid under pressure from the switch device 5 whereupon said device will operate to break the traction motor circuit between conductors 15 and 16.

With the operator's control lever 86 in neutral position fluid under pressure will be gradually released from diaphragm chamber 112 in said device to atmosphere through choke 113 and pipe 41, and after a period of time sufficient to insure operation of switch 115 and thereby of the electro-magnet device 126 and switch 5 to open the traction motor circuit between conductors 16 and 15, the pressure of fluid in said chamber will become sufficiently reduced to permit spring 109 to operate member 106 to move finger 105 out of the path of movement of lever 86 through the portion 102 of slot 101. The lever 86 may then be moved to the right hand end of portion 102 of slot 101 for thereby actuating the forward selector valve device 71 to supply fluid under pressure thru the forward pipe 31 to piston chamber 30 in the reversing motor 25. The reversing motor will then operate as before described to move the motor reverser 6 from its reverse position to its forward position to condition the traction motor 3 for operation in a forward direction and for also reconnecting the battery conductor 135 to the conductor 139 and thence thru the closed switch 143 to conductor 123. Movement of the operator's control lever 86 into the portion 103 of slot 101 will then cause operation of switch device 115 to effect energization of electro-magnet device 126 and thereby operation of the switch device 5 to close the traction motor circuit through wires 15 and 16, and then the speed control fluid motor 38 will be operated to accelerate the engine 1 to a degree corresponding to the position of the operator's control lever beyond the switch closed position in the portion 103 of slot 100, for in turn effecting a corresponding increase in any output of power from generator 2 for operating the traction motor 3 to drive the locomotive forwardly.

In order to cut off the supply of current to traction motor 3 for stopping the locomotive from movement in either direction it is only necessary to move the operator's control lever 86 into the portion 102 of slot 101 for opening the speed control pipe 41 to atmosphere whereupon the speed control motor 38 will operate to reduce the speed of the engine to idling for correspondingly reducing the power output from generator 2, followed by operation of the switch device 115 to open the circuit to the electro-magnet device 126 to cause operation of the switch device 5 to open the traction motor circuit between conductors 15 and 16.

From the above description it will now be seen that when the operator desires to reverse the direction of movement of the locomotive the finger 105 acting to prevent movement of the lever 86 past neutral position insures operation first of the speed control motor 38 to idling position to permit reduction in speed of the engine to idling with a corresponding reduction in output of generator 2, and then operation of the switch device 115 and of the electro-magnet device 126 and switch 5 to open the traction motor circuit thru conductors 15 and 16 before operation of said lever is permitted to cause operation of the reversing motor 25 and motor reverser 6 to reverse the connections to the traction motor field 10. Further, as soon as the finger 105 is pulled from the path of movement of lever 86 and said lever is moved to the opposite end of the portion 102 of slot 101 and then into the portion 103 or 104, as the case may be, the motor reverser 6 immediately starts to move out of whichever position it is in toward its other position, and as soon as it starts to move it breaks the connection between battery 137 and conductor 139 and maintains this connection broken until the reversing movement is completed. Thus if, in reversing the locomotive, the lever 86 is moved at a normal rate from neutral position into the portion 103 or 104 of the slot 101, as the case may be, and fluid is supplied to the speed control pipe 41 at a pressure to operate the switch device 115 to its circuit closing position, operation of the switch device 5 to close the traction motor circuit will be positively prevented until after the motor reverser obtains the position to which it is being moved for connecting the battery 137 to the conductor 139; following which the switch device 5 will operate to close the traction motor circuit.

The switch device 5 thus opens the traction motor circuit before the motor reverser 6 opens its circuit contacts and said reverser closes its circuit contacts ahead of the switch device 5, so that said reverser is not required to either make or break said circuit during current flow to the traction motor 3. The contacts in the motor reverser 6 need therefore be only of ample size to carry current for operating the motor 3, since the motor circuit is never broken by said contacts during flow of current.

Opening of the manually operable switch 143 will permit operation of engine 1 at any desired speed without causing operation of the traction motor 3, since under such a condition the switch device 5 will maintain the traction motor circuit open, and this is desirable under certain conditions as for example to permit warming up of the engine or to permit use of said engine, for operating auxiliary apparatus such as an air compressor (not shown) for charging an air supply system on the locomotive, without moving the locomotive.

If handle 148 of the manually operable valve device 145 is operated to turn the valve 147 to the position indicated by dot-dash line 149, the fluid pressure supply pipe 75 will be open to atmosphere through vent port 152 for thereby cutting off the supply of fluid under pressure to the operator's control valve device 70 so as to prevent supply of fluid to the speed control fluid motor 38 and to the reverser motor 25, whereby operation of the locomotive will be positively prevented under a condition, where, for example, it is desired to work on the locomotive. If the stop pipe 63 is also controlled through the manually operative control device 145, it will be open to the fluid pressure supply pipe 146 when the fluid pressure supply pipe 75 is open to atmosphere for thereby providing fluid under pressure in diaphragm chamber 62 of the fluid motor 38 for actuating said motor to move the fuel control lever 36 on the engine 1 to its stop position to cause stopping of the engine while the locomotive is being worked on, if such is desirable.

*Description Fig. 5*

If desired, the switch contacts 138, 140 and 142 in the motor reverser 6 may be dispensed with and the conductor 139 may be connected directly to battery 137, and a double check valve device 153 may be associated with the reversing motor 25, as shown in Fig. 5 of the drawing, for accomplishing the same result as obtained by use of said contacts in the structure shown in Fig. 1.

The double check valve device 153 comprises a casing containing a double check valve 154 arranged to control communication between pipes 155 and 156 connected to opposite ends of said device and pipe 129 from the electromagnet valve device 126. In the position of the double check valve 154 in which it is shown in the drawing it opens communication between the pipe 155 and a passage 157 in the casing while closing communication between said passage and pipe 156, while in an opposite position said check valve will close communication between said passage 157 and pipe 155 and open said passage to pipe 156. The passage 157 is connected to the fluid pressure supply pipe 129 leading to the electromagnet valve device 126. The pipe 155 is so connected to the reversing motor 25 as to be open to pressure chamber 30 only when the reversing piston 26 is in its forward position, in which it is shown in the drawing, and to at all other times be open to non-pressure chamber 24 formed between the two pistons 26 and 27. The pipe 156 is adapted to be opened to pressure chamber 32 only when piston 27 and the motor reverser 6 are in the reverse position and at all other times pipe 156 is adapted to be opened to the non-pressure chamber 24.

By this arrangement when the operator's control lever 86 is returned from either the portion 103 or 104 of the slot 101 to its neutral position for venting chamber 30 or 32 in the reversing motor 25, the supply of fluid under pressure to the electro-magnet device 126 thru pipe 129 will be cut off and will then be maintained cut-off until after the reversing motor 25 operates to position the motor reverser 6 in accordance with the operation of the operator's control lever 86, so as to thereby insure against supply of fluid under pressure to operate the switch device 5 for closing the traction motor circuit until after the motor reverser 6 obtains the position corresponding to that of the operator's control lever 86.

*Description Figs. 6 and 7*

In both of the structures disclosed in Figs. 1 and 5 of the drawings, there is a possibility of causing the switch device 5 to be moved to its circuit closing position before operation of the motor reverser 6 occurs to reverse the electrical connections to the traction motor 3 under which condition the motor reverser would break the circuit between the generator 2 and said motor which is contrary to intended operation and undesirable for it will result in burning of the contacts in the motor reverser.

The unintended operation of the apparatus, just described, will not occur if the operator's control lever 86 is moved at a normal rate, and can result only if said lever is moved at an abnormal rate from one position to another. For instance if the lever 86 is in neutral position following operation of the locomotive in a forward direction and is moved at an abnormally rapid rate to at least the switch closed position in the portion 104 of slot 101, there is a possibility that the switch device 5 may move to its circuit closed position before the motor reverser 6 starts to operate. The motor reverser 6 when it starts to operate will then have to break the circuit between generator 2 and the traction motor 3. The possibility of this occurring is even greater if the lever 86 is in the portion 102 of slot 101 at the junction with portion 103 and is flashed from this position to the switch closed position in the portion 104 of said slot, for under such a condition operation of the reversing motor by fluid under pressure supplied to the reverse pipe 33 will be delayed until the fluid under pressure is reduced in the forward pipe 31. The undesired operation just described may also occur upon flash operation of lever 86 to change the direction of operation of the locomotive from reverse to forward, as will be clear without a detailed description herein.

In order to positively prevent operation of the switch device 5 to its circuit closed position prior to operation of the motor reverser 6, and to also ensure that said device will remain in its circuit opening position until after said motor reverser has completed its movement and thereby prevent the undesired operation above described, regardless of how the operator's control lever 86 is moved, the apparatus shown in Figs. 1 and 5 of the drawings may be modified in the manner shown in Figs. 6 and 7, respectively.

Referring first to the modification shown in Fig. 6. According to this modification there is added to the equipment two switch devices 159 and 160 arranged to be controlled by pressure of fluid in the forward and reverse pipes 31 and 33, respectively, for controlling in series with the motor reverser 6, the manually operative switch 143 and the switch device 115, the circuit thru magnet 125 of the electro-magnet valve device 126.

The two switch devices 159 and 160 are of identical structure and each may comprise a casing containing a piston 161 subject on one side to pressure of fluid in a pressure chamber 162 which is open to the respective ahead pipe 31 or reverse pipe 33. At the opposite side of piston 161 is a non-pressure chamber 163 containing a spring 164 acting on the piston in opposition to pressure of fluid in chamber 162. A rod 165 projecting from piston 164 carries outside of the casing a movable contact 166 arranged to electrically connect two fixed contacts 167. The battery 137 is connected to one of the fixed contacts 167 at each of the switch devices 159 and 160. At the switch device 159 the other contact 167 is connected to conductor 136, while at the switch device 160 the other contact 167 is connected to conductor 135.

In each of the switch devices 159 and 160 the piston 161 will move the contact 166 into circuit closing relation with the fixed contacts 167 when the pressure of fluid in chamber 162 exceeds the opposing pressure of spring 164 and will move contact 166 out of circuit closing relation with contacts 167 when the pressure of fluid is reduced to below that of said spring. The pressure of spring 164 on piston 161 is such as to require an increase in pressure of fluid in the forward or reverse pipe 31 or 33 to a degree exceeding that required for operating the reversing motor 25, to move said piston to its circuit closing position and said piston will be moved to its circuit opening by said spring upon a slight reduction in such pressure.

In operation, if the control lever 86 is in neutral position opening both the forward and reverse pipes 31 and 33 to atmosphere, and as a consequence of which both of the switch devices 159 and 160 will be in their circuit opening position, and said lever is then flashed to one or the other switch closed position, as the case may be for effecting reversing operation of the reversing motor 25, the switch device 159 or 160 will prevent closing of the circuit thru magnet 125 until after the pressure of fluid in pipe 31 or 33 has been increased to a degree in excess of that required for operating the reversing motor 25, so that said motor will first operate to move the reverser 6 to the selected position followed by operation of the switch device 159 or 160 to its circuit closing position, whereupon the magnet 125 will be energized to effect operation of the electro-magnet valve device 126 and thereby of switch 5 to close the traction motor circuit.

On the other hand, if the lever 86 is at the end of the control portion 102 of slot 101 for charging the forward pipe 31 and for thereby causing operation of the switch device 159 to its circuit closing position, and said lever is moved to the switch closed position in the portion 104 of said slot, said switch device will operate to its circuit opening position before the reversing motor 25 starts to operate and the switch device 160 will remain in its circuit opening position until after operation of said reversing motor is completed, thereby ensuring that the switch device 5 will be in its circuit opening position prior to operation of said reversing motor and of the motor reverser 6 and will remain in said position until after the reversing operation of said motor and reverser has been completed. In a like manner the switch devices 159 and 160 will cause the switch device 5 to be in its circuit opening position, in changing the direction of locomotive movement from reverse to forward, before reversing operation of the motor reverser 6 starts and until after it is completed.

As a still further precaution against obtaining the undesired operation above mentioned, particularly in case of flash movement of the operator's control lever 86 from one end of the portion 102 of the slot 101 to the opposite end and thence at least to the adjacent switch closed position, under which condition fluid under pressure will be released from one of the pipes 31 or 33 at the same time as fluid under pressure is being supplied to the other pipe, there is provided in each of said pipes a device 168 including a check valve 169 and a choke 170, said check valve being arranged to render said choke effective to restrict flow of fluid to the respective pipe, while release of fluid under pressure from the respective pipe is adapted to occur past said check valve thru a communication by passing and of greater flow capacity than said choke. With this arrangement, when the operator's control lever 86 is operated to release fluid under pressure from either pipe and to at the same time supply fluid under pressure to the other pipe, the relatively rapid reduction in pressure in the one pipe will ensure operation of the respective switch device 159 or 160 to its circuit opening position before it is possible to obtain in the other pipe thru the respective choke 170 sufficient pressure to even start the reversing motor 25 to operate.

The modification shown in Fig. 7 of the drawing is the same as that shown in Fig. 6, except that the two switch devices 159 and 160 are arranged to control in parallel the supply of electric current from battery 137 to the manually operative switch device 143, and the operation of this modification to ensure that the switch device 5 will be in its circuit opening position prior to the start of operation of the motor reverser and until after such operation is completed will be clear from the description of the modification shown in Fig. 6 without further comment.

The device 168 including the check valves 169 and chokes 170 may also be associated with the structure shown in Fig. 7, if such is desired.

Since the switch devices 159 and 160 and the devices 168, which are necessary merely to prevent an undesired operation incident to abnormal movement of the operator's control lever 86 as above described, positively insures that the switch device 5 will be in its circuit opening position prior to start of reversing operation of the reverser 6 and will remain in said position until after operation of said reverser has been completed, it is possible when this structure is used to eliminate the finger 105 and the associated parts and control means therefor in the operator's control valve device 70.

Having now described the invention what I claim as new and desire to secure by Letters Patent is:

1. In combination, a reversible electric motor, reversing means for said motor movable to forward and reverse motor circuit closing positions, circuit control means cooperative with said reversing means in said forward and reverse positions to establish said circuit through said motor, an operator's control device comprising means operable to effect movement of said reversing means to its forward and reverse positions and also operable to effect operation of said circuit control means to open and close said circuit, and means operable automatically, in response to operation of said operator's control device to effect movement of said reversing means to either one of its positions, to delay movement of said reversing means with respect to operation of said circuit control means to open said circuit, and to delay operation of said circuit control means to close said circuit until after cessation of movement of said reversing means.

2. In combination, a reversible electric motor, reversing means for said motor movable to forward and reverse motor circuit closing positions, circuit control means cooperative with said reversing means in said forward and reverse positions to establish said circuit through said motor, an operator's control device comprising means operable to effect movement of said reversing means to its forward and reverse positions and also operable to effect operation of said circuit control means to open and close said circuit, means operable automatically, in response to operation of said operator's control device to effect movement of said reversing means to either one of its positions, to delay movement of said reversing means with respect to operation of said circuit control means to open said circuit, and means controlled by said reversing means operable to prevent operation of said circuit control means to close said circuit during movement of said reversing means and to effect operation of said circuit control means to close said circuit upon cessation of movement of said reversing means.

3. In combination, a reversible electric motor, reversing means for said motor movable to forward and reverse motor circuit closing positions, circuit control means cooperative with said reversing means in said forward and reverse positions to establish said circuit through said motor, an operator's control device comprising a lever having forward, reverse and neutral positions, means operable upon movement of said lever to its forward and reverse positions to effect operation of said reversing means to, respectively, its forward and reverse positions, other means operable upon movement of said lever to its neutral position to effect operation of said circuit control means to open said circuit, means associated with said reversing means cooperative with said other means in said forward and reverse positions of said lever to close said circuit, and means for automatically delaying for an interval of time movement of said lever out of said neutral postion to either its forward or reverse position from, respectively, its reverse or forward position.

4. In combination, a reversible electric motor, reversing means for said motor movable to forward and reverse motor circuit closing positions, circuit control means having circuit closing and opening positions and cooperative with said reversing means to control said motor circuit, an operator's control device comprising a lever having forward, reverse and neutral positions, selector means operable by said lever in said forward and reverse positions to effect movement of said reversing means to the corresponding position, means operable by said lever in said forward and reverse positions to effect operation of said circuit control means to its circuit closing position and operable by said lever in its neutral position to effect operation of said circuit control means to its circuit opening position, and other means having circuit opening and closing positions and cooperative with said circuit control means and reversing means to control said motor circuit and operable to its circuit opening position upon operation of said selector means in response to movement of said lever to its neutral position and operable to its circuit closing position upon movement of said reversing means to either its forward or reverse positions.

5. In combination, a reversible electric motor, reversing means for said motor movable to forward and reverse motor circuit closing positions, an operator's control device comprising a lever having forward, reverse and neutral positions, means operable by said lever in said forward and reverse positions to effect operation of said reversing means to the corresponding position, a first means having a circuit opening position and circuit closing position for controlling said circuit, means operable by said lever in its forward and reverse positions to effect operation of said first means to its circuit closing position and in its neutral position to effect operation of said first means to its circuit opening position, and circuit control means cooperative with said first means to control said circuit and operable upon movement of said lever to said neutral position to effect opening of said circuit, and upon movement of said reversing means to said forward and reverse positions to effect closing of said circuit.

6. In combination, a reversible electric motor, reversing means for said motor movable to forward and reverse motor circuit closing positions, circuit control means cooperative with said reversing means in said forward and reverse positions to establish said circuit through said motor, an operator's control device comprising a lever having a forward position, a reverse position, and a neutral position and means operable upon movement of said lever to its forward and reverse positions to effect movement of said reversing means to the corresponding position, means conditioned with said lever in said forward and reverse positions to delay for a chosen interval of time in said neutral position movement of said lever from either one of said forward or reverse positions to the other, other means operable in said neutral position of said lever to effect operation of said circuit control means to its circuit opening position, and means conditionable in the forward and reverse positions of said reversing means to cooperate with said circuit control means to effect operation of said circuit control means to close said motor circuit.

7. In combination, a reversible electric motor, motor reversing means movable to forward and reverse motor circuit closing positions, circuit control means operable by fluid under pressure to a circuit closing position and upon release of fluid under pressure to a circuit opening position, an operator's control device comprising a lever having forward, reverse and neutral positions, means operable upon movement of said lever to its forward and reverse positions to effect movement of said reversing means to the corresponding position, means operable with said lever in its forward and reverse positions to supply fluid under pressure to actuate said circuit control means and operable in said neutral position to release fluid under pressure from said circuit control means, blocking means operable by fluid under pressure supplied by said operator's control device in said forward and reverse positions to prevent movement of said lever through said neutral position from said forward position to said reverse position, and vice versa, means operable in said neutral position of said lever for releasing fluid under pressure from said blocking means to render same ineffective, and means conditioned in its forward and reverse positions of said reversing means to cooperate with said circuit control means to effect closing of said motor circuit.

8. In combination, a reversible electric motor, reversing means for said motor movable to forward and reverse motor circuit closing positions, a forward pipe, a reverse pipe, a fluid reversing motor operable by fluid under pressure in said forward pipe to move said reversing means to said forward position and operable by fluid under pressure in said reverse pipe to move said reversing means to said reverse position, an operator's control device comprising a lever having forward, reverse and neutral positions and selector means operable by movement of said lever to said forward position to supply fluid under pressure to said forward pipe and to vent said reverse pipe and operable upon movement of said lever to said reverse position to supply fluid under pressure to said reverse pipe and to vent said forward pipe and operable in said neutral position of said lever to vent both of said pipes, circuit control means having circuit opening and closing positions and cooperative with said reversing means to control said motor circuit, other means controlled by said lever operable to a circuit closing position in response to movement of said lever to its forward and reverse positions and to a circuit opening position in response to movement of said lever to its neutral position, and means cooperative with said other means to control said circuit control means and operative upon a reduction in pressure of fluid in either one of said pipes to effect operation of said circuit control means to its circuit opening position and operable upon movement of said reversing means to either one of its forward or reverse positions to effect operation of said circuit control means to its circuit closing position.

9. In combination, a reversible electric motor, reversing means for said motor movable to forward and reverse motor circuit closing positions, a forward pipe, a reverse pipe, a fluid reversing motor operable by fluid under pressure in said forward pipe to move said reversing means to said forward position and operable by fluid under pressure in said reverse pipe to move said reversing means to said reverse position, an operator's control device comprising a lever having forward, reverse and neutral positions, and selector means operable upon movement of said lever to said forward position to supply fluid under pressure to said forward pipe and to vent said reverse pipe and operable upon movement of said lever to said reverse position to supply fluid under pressure to said reverse pipe and to vent said forward pipe and operable in said neutral position of said lever to vent both of said pipes, circuit control means having circuit opening and closing positions and cooperative with said reversing means to control said motor circuit, a magnet operable upon energization to effect movement of said circuit control means to a circuit closing position and upon deenergization to effect movement of the circuit control means to its circuit opening position, and means for controlling the circuit thru said magnet comprising a switch device, means operable by said lever in its forward and reverse positions to effect operation of said switch device to a circuit closing position and operable by said lever in its neutral position to effect operation of said switch device to a circuit opening position, switch means connected in series with said switch device and operable upon venting of fluid under pressure from either one of said pipes to open the circuit thru said magnet and upon supply of fluid under pressure to either one of said pipes to close the circuit thru said magnet, and circuit control means arranged to control the circuit thru said magnet in series with said switch device and switch means and associated with said reversing means and operable in the forward and reverse positions thereof to a circuit closing position and operable when out of said forward and reverse positions to a circuit opening position.

10. In combination, a reversible electric motor, reversing means for said motor movable to forward and reverse motor circuit closing positions, a forward pipe, a reverse pipe, a fluid reversing motor operable by fluid under pressure in said forward pipe to move said reversing means to said forward position and operable by fluid under pressure in said reverse pipe to move said reversing means to said reverse position, an operator's control device comprising a lever having forward, reverse and neutral positions, and selector means operable upon movement of said lever to said forward position to supply fluid under pressure to said forward pipe and to vent said reverse pipe and operable upon movement of said lever to said reverse position to supply fluid under pressure to said reverse pipe and to vent said forward pipe and operable in said neutral position of said lever to vent both of said pipes, circuit control means having circuit opening and closing positions and cooperative with said reversing means to control said motor circuit, a circuit control motor operable by fluid under pressure to effect movement of said circuit control means to its circuit closing position and upon release of fluid under pressure to its circuit opening position, and means controlled by said operator's control device and reversing means for controlling the supply of fluid under pressure to said circuit control motor and operable to effect such supply with both said lever and reversing means in either their forward or reverse position and to prevent such supply upon movement of said lever out of either its forward position or its reverse position to its neutral position when said reversing means is in a position other than corresponding to that of said lever.

11. In combination, a reversible electric motor, reversing means for said motor movable to forward and reverse motor circuit closing positions, a forward pipe, a reverse pipe, a fluid reversing motor operable by fluid under pressure in said forward pipe to move said reversing means to said forward position and operable by fluid under pressure in said reverse pipe to move said reversing means to said reverse position, an operator's control device comprising a lever having forward, reverse and neutral positions, and selector means operable upon movement of said lever to said forward position to supply fluid under pressure to said forward pipe and to vent said reverse pipe and operable upon movement of said lever to said reverse position to supply fluid under pressure to said reverse pipe and to vent said forward pipe and operable in said neutral position of said lever to vent both of said pipes, circuit control means having circuit opening and closing positions and cooperative with said reversing means to control said motor circuit, a circuit control motor operable by fluid under pressure to effect movement of said circuit control means to a circuit closing position and upon release of fluid under pressure to a circuit opening position, an electro-magnet device operative upon energization to establish a communication for supplying fluid under pressure to said circuit control motor and operable upon deenergization to close said communication and to vent fluid under pressure from said circuit control motor, an energizing circuit for said magnet comprising a first switch means for opening and closing said energizing circuit, means controlled by said lever operable upon movement thereof to said neutral position to effect operation of said first switch means to its circuit opening position and operable upon movement of said lever to either its forward position or its reverse position to effect operation of said switch means to its circuit closing position, other switch means arranged to control in series with said first switch means said energizing circuit and operable upon venting of fluid under pressure from either one of said pipes to a circuit opening position and upon supply of fluid under pressure to the other pipe to a circuit closing position, and contact means associated with said reversing means controlling said energizing circuit in series with said first and other switch means and operative in said forward and reverse positions of said reversing means to close said energizing circuit and when out of said forward and reverse positions of said reversing means to open said energizing circuit.

12. In combination, a reversible electric motor, reversing means for said motor movable to forward and reverse motor circuit closing positions, a forward pipe, a reverse pipe, a fluid reversing motor operable by fluid under pressure in said forward pipe to move said reversing means to said forward position and operable by fluid under pressure in said reverse pipe to move said reversing means to said reverse position, an operator's control device comprising a lever having forward, reverse and neutral positions, and selector means operable upon movement of said lever to said forward position to supply fluid under pressure to said forward pipe and to vent said reverse pipe and operable upon movement of said lever to said reverse position to supply fluid under pressure to said reverse pipe and to vent said forward pipe and operable in said neutral position of said lever to vent both of said pipes, circuit control means having circuit opening and closing positions and cooperative with said reversing means to control said motor circuit, a circuit control motor operable by fluid under pressure to effect movement of said circuit control means to a circuit closing position and upon release of fluid under pressure to a circuit opening position, an electro-magnet device operative upon energization to establish communication for supplying fluid under pressure to said circuit control motor and upon deenergization to close said communication and to vent fluid under pressure from said circuit control motor, a switch device for controlling energization and deenergization of said electro-magnet device, means operable by said lever in its forward and reverse positions to effect operation of said switch device to effect energization of said electro-magnet device and operable upon movement of said lever to said neutral position to effect operation of said switch device to effect deenergization of said magnet device, and means including said reversing motor operable to supply fluid under pressure to said magnet device upon movement of said reversing means to its forward and reverse positions and to cut off the supply of fluid under pressure to said magnet device upon venting of fluid under pressure from said reversing motor through either one of said pipes.

13. In combination, a reversible electric motor, reversing means for said motor movable to a forward position upon supply of fluid under pressure to a forward pipe and to a reverse position upon supply of fluid under pressure to a reverse pipe, a third pipe, an operator's control device comprising a lever having forward, reverse and neutral positions, means operable upon movement of said lever to its forward position to supply fluid under pressure to said forward and third pipes and to vent said reverse pipe and operable by said lever in said reverse position to supply fluid under pressure to said reverse and third pipes and to vent said forward pipe and operable in said neutral position to vent all of said pipes, circuit control means adapted to cooperate with said reversing means in said forward and reverse positions of said reversing means to establish an electric circuit thru said motor, and interlock means controlling said circuit control means and operable upon venting fluid under pressure from said third pipe and from either said first or second pipe to effect operation of said circuit control means to open said motor circuit and upon supply of fluid under pressure to said third pipe and to either said second or first pipe and upon movement of said reversing means into either its forward or its reverse position to effect operation of said circuit control means to close said motor circuit.

14. In combination, a reversible electric motor, reversing means for said motor movable to a forward position upon supply of fluid under pressure to a forward pipe and to a reverse position upon supply of fluid under pressure to a reverse pipe, a third pipe, an operator's control device comprising a lever having forward, reverse and neutral positions, means operable upon movement of said lever to its forward position to supply fluid under pressure to said forward and third pipes and to vent said reverse pipe and operable by said lever in said reverse position to supply fluid under pressure to said reverse and third pipes and to vent said forward pipe and operable in said neutral position to vent all of said pipes, switch means arranged to be operated by fluid under pressure to cooperate with said reversing means in its forward and reverse positions to establish an electric supply circuit thru said motor and upon release of fluid under pressure to disestablish said circuit, an electro-magnet means operable upon energization to establish a fluid pressure supply communication to said switch means and upon deenergization to disestablish said communication and to release fluid under pressure from said switch means, a second switch means for controlling an energizing circuit thru said electro-magnet device and movable to a circuit closing position upon supply of fluid under pressure to said third pipe and to a circuit opening position upon release of fluid under pressure from said third pipe, a third switch means controlled by pressure of fluid in said forward pipe and movable to a circuit closing position upon supply of fluid under pressure thereto and to a circuit opening position upon release of said fluid pressure, a fourth switch means controlled by pressure of fluid in said reverse pipe and movable to a circuit closing position upon supply of fluid under pressure thereto and to a circuit opening position upon release of fluid under pressure from said reverse pipe, and circuit closing means associated with said reversing means operable in the forward position thereof to connect said third switch means in series with said second switch means and in said reverse position to connect said fourth switch means in series with said second switch means, said third or fourth switch means in its circuit closing positions being effective to supply electric current to said reversing means for supply through said second switch means to said electro-magnet device for effecting energization thereof.

15. In combination, a reversible electric motor, reversing means for said motor movable to a forward position upon supply of fluid under pressure to a forward pipe and to a reverse position upon supply of fluid under pressure to a reverse pipe, a third pipe, an operator's control device comprising a lever having forward, reverse and neutral positions, means operable upon movement of said lever to its forward position to supply fluid under pressure to said forward and third pipes and to vent said reverse pipe and operable by said lever in said reverse position to supply fluid under pressure to said reverse and third pipes and to vent said forward pipe and operable in said neutral position to vent all of said pipes, a pneumatic switch movable to a circuit closing position by fluid under pressure to cooperate with said reversing means in said forward and reverse position to establish an electric supply circuit thru said motor and operable upon release of fluid under pressure to disestablish said circuit, an electro-magnet device operable upon energization to establish a fluid pressure supply communication to said pneumatic switch, and operable upon deenergization to disestablish said communication and to release fluid under pressure from said pneumatic switch, another pneumatic switch controlled by pressure of fluid in said third pipe and operable upon supply of fluid under pressure to said third pipe to effect energization of said electro-magnet device and upon release of fluid under pressure from said third pipe to effect deenergization of said electro-magnet device, and means for controlling the supply of fluid under pressure to said electro-magnet device for operating the first named switch and operable upon release of fluid under pressure from either said forward pipe or said reverse pipe to release fluid under pressure from the first named pneumatic switch and operable to supply fluid under pressure to said first named pneumatic switch in said forward and reverse positions of said reversing means and to prevent said supply during movement between said forward and reverse positions.

16. In combination, a reversible electric motor, a forward pipe, a reverse pipe, fluid pressure actuated reversing means for said motor operable upon supply of fluid under pressure to said forward pipe to a forward motor circuit closing position and upon supply of fluid under pressure to said reverse pipe to a reverse motor circuit closing position, circuit control means having a circuit opening position and a circuit closing position and adapted to cooperate with said reversing means in said forward and reverse positions to close said motor circuit, an operator's control device comprising a lever having forward, reverse and neutral positions, and means operable upon movement of said lever to said forward position to supply fluid under pressure to said forward pipe and to vent said reverse pipe, and operable upon movement of said lever to said reverse position to supply fluid under pressure to said reverse pipe and to vent said forward pipe, and operable in neutral position of said lever to vent both of said pipes, and means controlled by pressure of fluid in said pipes operable automatically upon movement of said lever from either said forward or reverse position to respectively said reverse or forward position to effect operation of said circuit control means to its circuit opening position prior to operation of said reversing means and to its circuit closing position subsequent to operation of said reversing means.

17. In combination, a reversible electric motor, a forward pipe, a reverse pipe, fluid pressure actuated reversing means for said motor operable upon supply of fluid under pressure to said forward pipe to a forward motor circuit closing position and upon supply of fluid under pressure to said reverse pipe to a reverse motor circuit closing position, circuit control means having a circuit opening position and a circuit closing position and adapted to cooperate with said reversing means in said forward and reverse positions to close said motor circuit, an operator's control device comprising a lever having forward, reverse and neutral positions, and means operable upon movement of said lever to said forward position to supply fluid under pressure to said forward pipe and to vent said reverse pipe, and operable upon movement of said lever to said reverse position to supply fluid under pressure to said reverse pipe and to vent said forward pipe, and operable in neutral position of said lever to vent both of said pipes, a first fluid pressure responsive means connected to said forward pipe, a second fluid pressure responsive means connected to said reverse pipe, said first and second fluid pressure responsive means operating upon a reduction in pressure of fluid in the respective pipe and supply of fluid under pressure to the other pipe upon movement of said lever from either said forward position or reverse position to respectively said reverse or forward position to effect operation of said circuit control means to open said motor circuit ahead of operation of said reversing means and to close said motor circuit subsequent to operation of said reversing means.

18. In combination, a reversible electric motor, a forward pipe, a reverse pipe, fluid pressure actuated reversing means for said motor operable upon supply of fluid under pressure to said forward pipe to a forward motor circuit closing position and upon supply of fluid under pressure to said reverse pipe to a reverse motor circuit closing position, circuit control means having a circuit opening position and a circuit closing position and adapted to cooperate with said reversing means in said forward and reverse positions to close said motor circuit, an operator's control device comprising a lever having forward, reverse and neutral positions, and means operable upon movement of said lever to said forward position to supply fluid under pressure to said forward pipe and to vent said reverse pipe, and operable upon movement of said lever to said reverse position to supply fluid under pressure to said reverse pipe and to vent said forward pipe, and operable in neutral position of said lever to vent both of said pipes, a first fluid pressure responsive means connected to said forward pipe, a second fluid pressure responsive means connected to said reverse pipe, said first and second fluid pressure responsive means operating upon a reduction in pressure of fluid in the respective pipe and supply of fluid under pressure to the other pipe upon movement of said lever from either said forward position or reverse position to respectively said reverse or forward position to effect operation of said circuit control means to open said motor circuit ahead of operation of said reversing means and to close said motor circuit subsequent to operation of said reversing means, means for restricting supply of fluid under pressure to said first and second fluid pressure responsive means for said operator's control device, and means providing for venting of fluid under pressure at a more rapid rate from said first and second fluid pressure responsive means by operation of said operator's control device.

19. In combination, a reversible electric motor, reversing means for said motor movable to forward and reverse motor circuit closing positions, circuit control means having circuit closing and opening positions and cooperative with said reversing means to control said motor circuit, an operator's control device comprising a lever having forward and reverse positions, means responsive to movement of said lever to said forward and reverse positions to effect movement of said reversing means to the corresponding position, and other means operable upon movement of said lever from said forward position to said reverse position, or vice versa, to effect operation of said circuit control means to its circuit opening position ahead of operation of said reversing means, and to its circuit closing position subsequent to operation of said reversing means.

20. A control apparatus for controlling the speed of an engine and the supply of electric current from generator driven by said engine to an electric motor comprising in combination, a speed control pipe, speed regulating means for said engine operable to vary the speed of said engine in proportion to the pressure of fluid in said pipe, reversing means for said motor having forward and reverse current supply positions, circuit control means cooperative with said reversing means in its forward and reverse positions to close an electric current supply circuit from said generator to said motor, an operator's control device having forward and reverse positions for supplying fluid under pressure to said pipe and having a neutral position for releasing fluid under pressure from said pipe, means operable in said forward and reverse positions of said operator's control device to effect movement of said reversing means to the corresponding position, and means operable upon a reduction in pressure of fluid in said pipe in response to movement of said operator's control device to said neutral position to effect operation of said circuit control means to open said supply circuit to said motor and operable upon supply of fluid under pressure to said pipe with said reversing means in either said forward or reverse position to effect operation of said circuit control means to close said supply circuit.

21. A control apparatus for adjusting a speed control element on an engine and for controlling the flow of electric current from a generator driven by said engine to an electric motor, said element having an engine idle position, a stop position, and a zone of movement for varying the speed of said engine in proportion to the extent of movement out of said idle position, said apparatus comprising in combination, a control pipe, speed regulating means operable upon supply of fluid under pressure to said pipe to adjust said speed control element out of said idling position and operable upon release of fluid under pressure from said pipe to adjust said speed control element to said idling position, fluid actuated reversing means movable to either a forward or a reverse position for controlling flow of electric current from said generator to said motor to effect operation of said motor in either one direction or in the opposite direction, a source of fluid under pressure, an operator's control device for establishing communication between said source of fluid under pressure and said speed control pipe, and said reversing means, a manually adjustable valve in the communication between said source of fluid pressure and said operator's control device and having an open position for establishing the communication between said source and said operator's control device and having a closed position for closing such communication and for opening to atmosphere the fluid pressure supply connection to said operator's control device, means operable by fluid under pressure to effect movement of said speed control element to said stop position, said manually adjustable valve in its said open position releasing fluid under pressure from the last named means and in its closed position supplying fluid under pressure thereto.

22. A control apparatus for controlling the speed of an engine and the supply of electric current from a generator driven by said engine to an electric motor comprising in combination, a speed control pipe, speed regulating means for said engine operable to vary the speed of said engine in proportion to the pressure of fluid in said pipe, reversing means for said motor having forward and reverse current supply positions, circuit control means cooperative with said reversing means in its forward and reverse positions to close an electric current supply circuit from said generator to said motor, an operator's control device having forward and reverse positions for supplying fluid under pressure to said pipe and having a neutral position for releasing fluid under pressure from said pipe, means operable in said forward and reverse positions of said operator's control device to effect movement of said reversing means to the corresponding position, and manually operative means for also effecting operation of said circuit control means to open said supply circuit.

ARTHUR G. LARSON.